US006721997B2

(12) United States Patent
Hua

(10) Patent No.: US 6,721,997 B2
(45) Date of Patent: Apr. 20, 2004

(54) HANDLE FOR TAPE DISPENSER

(75) Inventor: Wei-Hsiu Hua, Taipei (TW)

(73) Assignee: Prudential Co., Ltd., Taipei (TW)

( * ) Notice: Subject to any disclaimer, the term of this patent is extended or adjusted under 35 U.S.C. 154(b) by 10 days.

(21) Appl. No.: 10/161,730

(22) Filed: Jun. 5, 2002

(65) Prior Publication Data

US 2003/0226239 A1 Dec. 11, 2003

(51) Int. Cl.[7] ............................................. B29C 45/14

(52) U.S. Cl. ............................ 16/431; 16/421; 16/430; 264/250; 264/255; 30/340

(58) Field of Search .......................... 16/431, 421, 430; 264/250, 255, 274, 267; 30/340; 81/117.1, 427.5, 489

(56) References Cited

U.S. PATENT DOCUMENTS 5,475,894 A * 12/1995 Wildforster .................. 16/430
5,528,834 A * 6/1996 Seber et al. .................. 30/340
5,640,741 A * 6/1997 Yano .......................... 16/421
5,781,963 A * 7/1998 Maru et al. ................... 16/430
6,108,869 A * 8/2000 Meessmann et al. .......... 16/430
6,138,734 A * 10/2000 Hamisch, Jr. ............... 156/384
6,148,701 A * 11/2000 Lee ............................. 81/489
6,228,306 B1 * 5/2001 Hoepfl et al. ............... 264/254
6,363,578 B1 * 4/2002 Chang .......................... 16/430
6,368,536 B1 * 4/2002 Hoepfl et al. ............... 264/250
6,386,070 B1 * 5/2002 Hong ............................ 81/20
6,581,247 B1 * 6/2003 Yu Chen ....................... 16/430

* cited by examiner

*Primary Examiner*—Gary Estremsky
*Assistant Examiner*—Mark Williams
(74) *Attorney, Agent, or Firm*—Rosenberg, Klein & Lee

(57) ABSTRACT

A handle for tape dispenser includes a plastic grip formed via a first time injection molding. The grip is provided at front and rear sides with shallow recesses that have smoothly curved profiles and predetermined depths. The grip is then positioned in a forming machine, so that two covers formed from a thermally plastic rubber material via a second time injection molding are set in the shallow recesses to tightly attach to the plastic grip, enabling comfortable and stable holding of the tape dispenser at the grip without unwanted sliding of the handle relative to a user's hand. Etched patterns, densely distributed dots or other grains may be formed on outer surfaces of the rubber covers to provide enhanced grip resistance.

3 Claims, 4 Drawing Sheets

HANDLE FOR TAPE DISPENSER

BACKGROUND OF THE INVENTION

The present invention relates to a handle for tape dispenser, and more particularly to a handle for tape dispenser that provides better hand properties and is adapted to prevent unwanted sliding of the tape dispenser relative to a user's hand.

FIG. 1 shows a general tape dispenser 100 that usually has a handle 1 assembled to a lower side thereof for a user to hold the tape dispenser 100 at the handle 1 and dispense a length of tape for sticking to a desired place on an article. The handle 1 for the tape dispenser 100 is normally integrally formed from a plastic material via injection molding and includes raised portions 11 to provide a wavy front surface for the handle 1 in an attempt to facilitate firm holding of the handle 1 with a hand. However, since the plastic handle 1 has considerably smooth outer surface that does not enable firm and stable holding of the handle with the hand, the tape dispenser 100 tends to slide relative to the user's hand to adversely affect work efficiency and productivity, particularly on a production line that requires quick taping operations.

SUMMARY OF THE INVENTION

It is therefore a primary object of the present invention to provide an improved handle for tape dispenser, so that the tape dispenser could be more stably held at the handle to avoid unwanted sliding of the tape dispenser relative to a user's hand and to enable enhanced work efficiency with the tape dispenser.

To achieve the above and other objects, the handle for tape dispenser according to the present invention mainly includes a grip that is made of a plastic material via a first time injection molding to form at front and rear sides shallow recesses having smoothly curved profiles and predetermined depths. The grip is then positioned in a forming machine, so that two covers formed from a thermally plastic rubber material via a second time injection molding are set in the shallow recesses to tightly attach to the plastic grip, enabling comfortable and stable holding of the tape dispenser at the grip without unwanted sliding of hand off the handle.

Etched patterns, densely distributed dots or other grains may be additionally formed on outer surfaces of the rubber covers to provide enhanced grip resistance.

The front and the rear shallow recesses of the grip may also be additionally provided with etched patterns, densely distributed dots, or other grains to enhance the attachment of the thermally plastic rubber covers to the shallow recesses.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
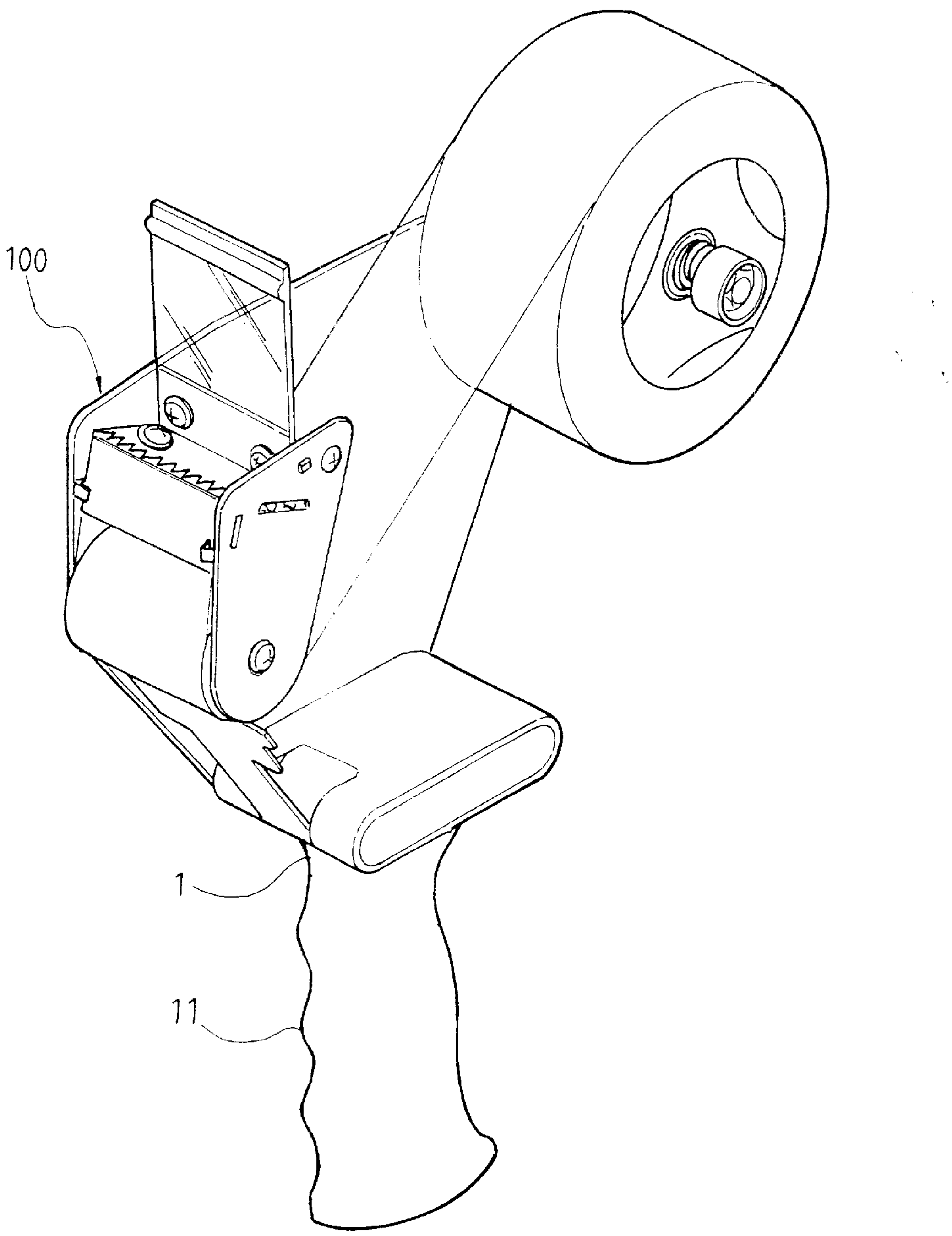
FIG.1 PRIOR ART
FIG. 1 is a perspective view of a tape dispenser having a conventional handle structure.
Figure 2:
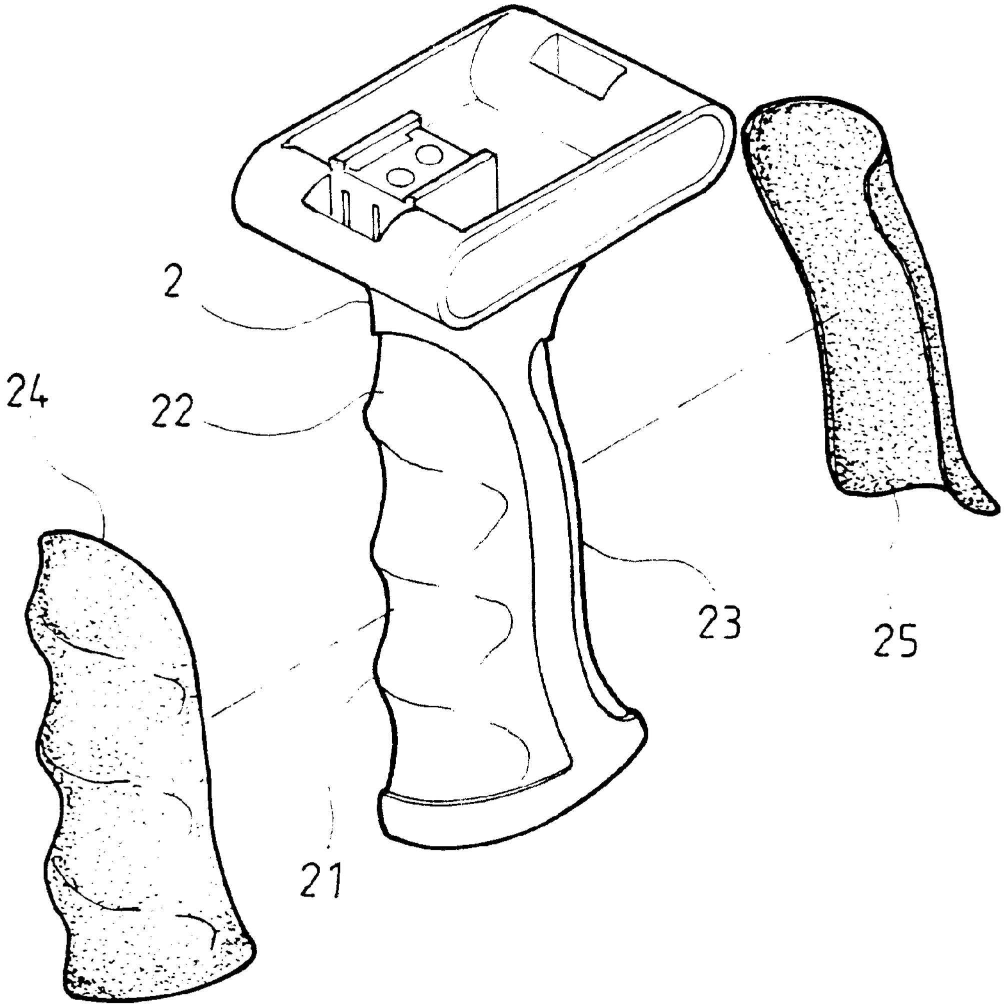
FIG. 2 is an exploded perspective view of a handle for tape dispenser according to a preferred embodiment of the present invention.
Figure 3:
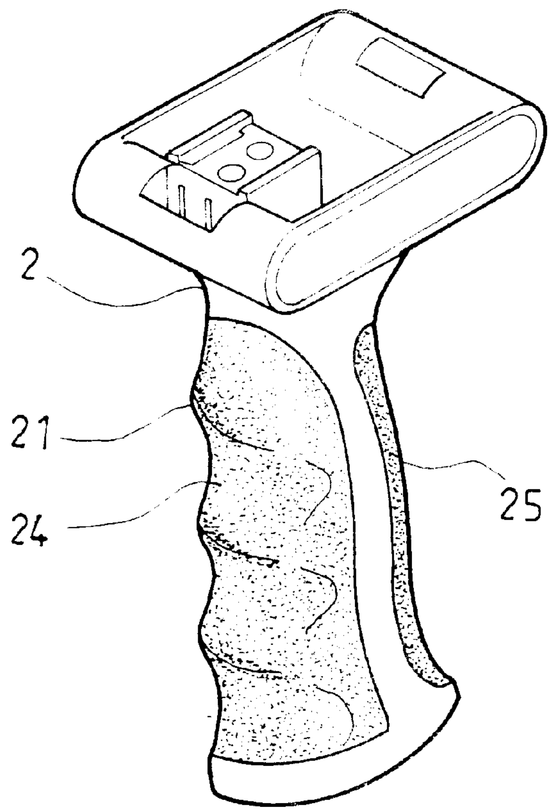
FIG. 3 is an assembled perspective view of FIG. 2.

Please refer to FIGS. 2 and 3 that are exploded and assembled perspective views, respectively, of a handle for tape dispenser according to a preferred embodiment of the present invention. As shown, the handle for tape dispenser according to the present invention mainly includes a grip 2 made of a plastic material through a first time injection molding. The grip 2 is provided at front and rear sides with shallow recesses 22 and 23, respectively, having smoothly curved profiles and predetermined depths. Raised portions 21 are formed in the front shallow recess 22 to provide the latter with a wavy surface. The injection-molded grip 2 is then positioned in a forming machine, so that a rubber material having thermal plasticity is formed into two grip covers 24, 25 through a second time injection molding to separately set in the front and the rear shallow recesses 22, 23 of the grip 2. In this manner, the thermally plastic rubber grip covers 24, 25 could be fitly, flatly, and tightly attached to the plastic grip 2. A tape dispenser using the grip 2 having rubber covers 24, 25 firmly attached to front and rear sides thereof could be more stably held at the grip 2 without undesirably sliding relative to a user's hand.

The thermally plastic rubber covers 24, 25 are molded to tightly attach to the front recess 22 having the raised portions 21 and the rear recess 23, respectively, and may be provided at outer surfaces with etched patterns, densely distributed dots, or other grains in the process of injection molding to enable comfortable holding of the grip 2 and prevent undesired sliding of the handle relative to the user's hand.

The front and the rear shallow recesses 22, 23 of the grip 2 may also be provided with etched patterns, densely distributed dots, or other grains to enhance the attachment of the thermally plastic rubber covers 24, 25 to the shallow recesses 22, 23.

Figure 4:
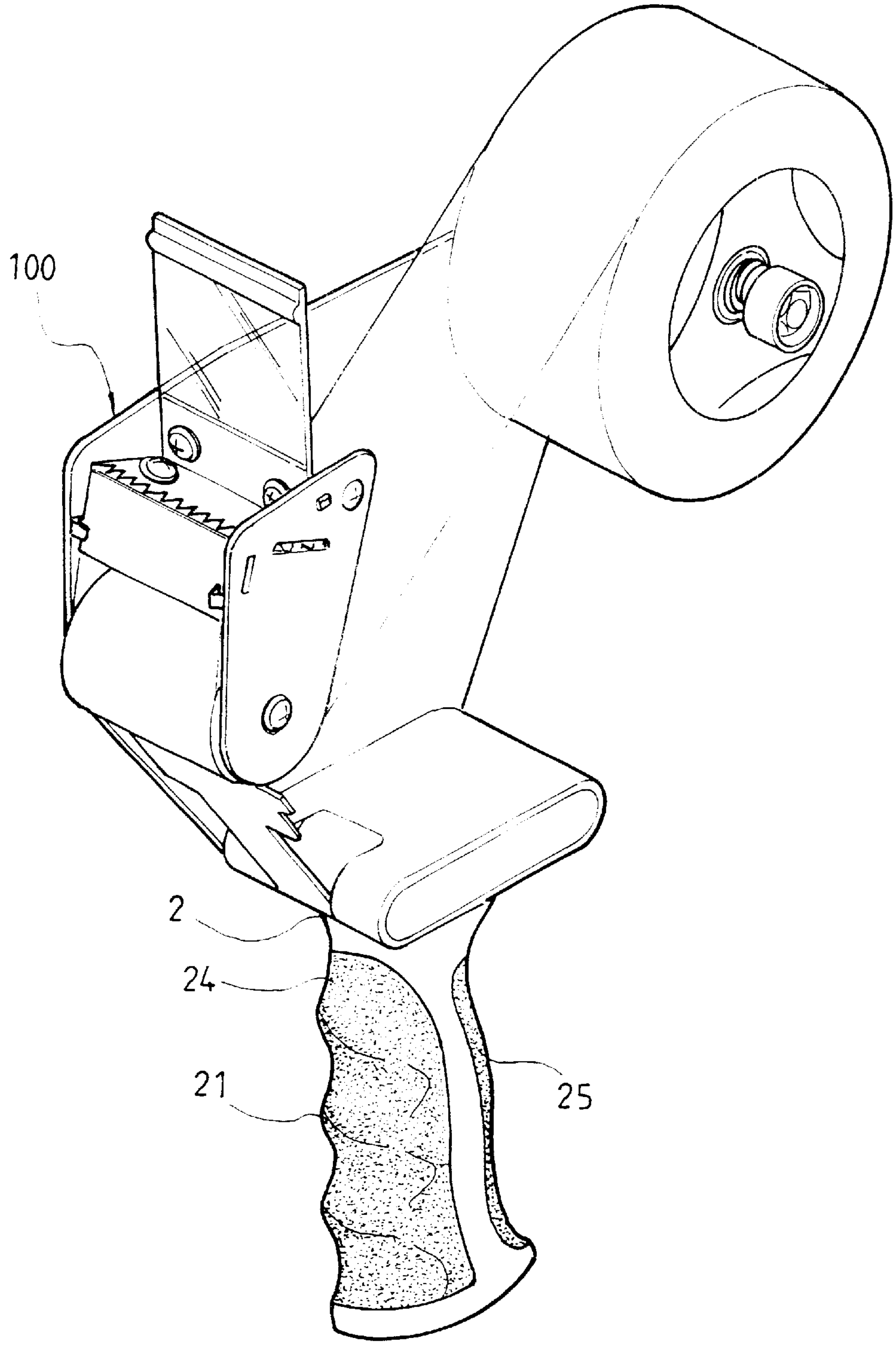
FIG. 4 is a perspective view of a tape dispenser having the handle of the present invention assembled thereto.

Please refer to FIG. 4. After the grip 2 is formed via the first time injection molding and the thermally plastic rubber covers 24, 25 are set in the front and the rear recesses 22, 23 of the grip 2 via the second time injection molding, the grip 2 is assembled to a lower side of the tape dispenser 100. To use the tape dispenser 100 for dispensing a length of tape, a user may highly stably hold the tape dispenser at the grip 2 with the holding hand tightly bearing against the thermally plastic rubber covers 24, 25 to facilitate dispensing of the tape and to avoid unwanted sliding of the grip 2 relative to the user's hand.

In brief, the plastic grip of the handle for tape dispenser according to the present invention is covered with thermally plastic rubber covers through the second time injection molding to facilitate stable holding of the handle and to avoid unwanted sliding of the handle relative to the user's hand during operating the tape dispenser, making the whole tape dispenser more practical for use.

What is claimed is:

1. A tape dispenser handle comprising:

a substantially rigid grip formed of a plastic material, said grip having top and bottom portions and an intermediate portion extending longitudinally therebetween, said intermediate portion having formed on opposing sides thereof front and rear surfaces fixed one relative to the other, each of said front and rear surfaces having formed therein a shallow recess; and, first and second covers respectively molded in conformed manner within said shallow recesses of said front and rear grip surfaces, each of said first and second covers being formed of a thermally plastic rubber material, said first and second covers being disposed respectively for frictionally engaging the fingers and heel of a user's hand wrapped about said intermediate portion of said grip to minimize slippage relative thereto.

2. The tape dispenser handle as recited in claim 1 wherein said first and second covers are substantially different in contour.

3. The tape dispenser handle as recited in claim 2 wherein said first cover is formed with an undulating surface contour defined by a plurality of raised portions separated by wavy depressed portions extending therebetween for receiving the fingers of the gripping hand in conforming manner.

* * * * *